United States Patent Office 3,758,430
Patented Sept. 11, 1973

3,758,430
VINYL POLYMER PLASTISOL COMPOSITION
Joseph Winkler, Hazleton, Pa., assignor to Tenneco Chemicals, Inc., New York, N.Y.
No Drawing. Original application Oct. 31, 1967, Ser. No. 679,554. Divided and this application Feb. 25, 1971, Ser. No. 118,944
Int. Cl. C09j 3/26
U.S. Cl. 260—27 R             4 Claims

ABSTRACT OF THE DISCLOSURE

A heat-sealable polyurethane foam formed by reaction between the foam-forming ingredients, in the presence of selected plastisols is described.

This is a division of application Ser. No. 679,554, filed Oct. 31, 1967, now U.S. Pat. 3,632,533.

This invention is concerned with novel heat-sealable polyurethane compositions and with the products prepared from them. More particularly, it is concerned with polyurethane cellular products which are heat-sealable to other materials to form novel and useful laminates. It is concerned also with the preparation of these useful compositions and with the vinyl plastisols used in such preparation.

The products of this invention manifest excellent heat-sealability, especially dielectric and flame sealability to each other and to other materials such as plastic films, especially vinyl films, and fabrics prepared from natural or synthetic fibers including wool, silk, nylon, acrylics, polyesters, polyolefins, cellulose and cellulose derivatives such as rayon and cellulose acetate.

Cellular polyurethanes, or polyurethane foams are widely used materials. For example, they are employed as light weight, resilient cushioning materials, especially as upholstery components in furniture and in cushions, pads, pillows and the like. They also have good insulation characteristics and are employed as linears for clothing and footwear. Their good resiliency makes them especially useful as safety and comfort component in automotive cushioning, especially in the upholstery, dash-board, door panels, arm rests, and similar components.

In most of these applications, modern methods of mass production require that the bond between the foam and the laminated material, such as woven or non-woven cloth, plastic film, fiber board, wood, or other supporting surface be effected rapidly. Thus sewing, stapling, riveting or other known methods of point to point bonding are not completely satisfactory, and the art has turned to other forms of sealing, especially dielectric and flame lamination.

Polyurethane foams are thermosetting with softening and melting points which are too high to permit heat-sealability under wholly satisfactory conditions. It has been found that when the temperature is increased sufficiently to attain a heat-seal between the foam and the substrate, the foam tends to discolor and decompose to produce gaseous products and a non-tacky liquid which does not form an acceptable seal. Moreover, the temperature at which any seal at all can be formed is often so high as to cause appreciable damage to the substrate, especially if it is a fine fabric.

To overcome these difficulties and yet avoid the necessity of mechanical bonding methods such as stapling, sewing, etc. attempts have been made to utilize adhesives, but these have been unsatisfactory since they complicate the manufacturing process and produce laminar products in which the desirable attributes of the cellular polyurethane are at least partially neutralized by the adhesive. The adhesives are often dissolved or suspended in organic solvents which have noxious odors. Often they are flammable, and present a removal and recovery problem.

The most successful procedure currently used for the production of heat-sealable foam products is a post-impregnation technique in which the cellular polyurethane is impregnated with a thermoplastic resin, suitably a vinyl resin such as polyvinyl acetate or polyvinyl chloride. Although this technique has been successful to a limited degree, it is not fully satisfactory. One reason is that it requires an additional impregnation step, thus adding to the cost of the final product and complicating its production. It also requires that the foam be almost completely open cell, i.e. have a structure consisting substantially entirely of inter-connected passageways, unobstructed by cell membranes as distinguished from closed cell structures in which the individual cells are isolated from adjoining cells by a membrane. It is not essential that the polyurethane foam be one hundred percent open cell, although it is preferred that the structure be at least ninety percent open cell. Such structures are not readily obtainable in normal foaming operations and it is often necessary to prepare them by special techniques which may involve special chemical, mechanical or explosive operations to destroy the cell membrane. These treatments markedly increase the cost and difficulty of producing foams suitable for impregnation.

The foam must be open cell for the impregnant to penetrate it to any appreciable degree. Useful products can be obtained with any of the foams generally defined by the art as open cell, but for uniformity of properties, especially density, appearance and sealability, it is better if only a limited number of the cells are closed and therefore impenetrable by the impregnant. Moreover, even when the foams utilized are of the desired quality, it is not possible to obtain a completely uniform impregnated product of a thickness of one inch or more.

The usual impregnants employed in the preparation of heat-sealable polyurethane foams, are plastisols of vinyl polymers containing one or more monomeric plasticizers. As used in this disclosure the terms "vinyl polymers," "plastisols" and "plasticizers" have the following meanings:

Vinyl polymers: Polymers or resins derived by polymerization or copolymerization of vinyl monomers including, for example, vinyl chloride, vinyl acetate, vinylidene chloride, vinyl propionate, vinyl butyrate, and others characterized by the presence of a carbon-carbon double bond in the monomer molecule, which opens during polymerization to generate the carbon chain of the polymer. Typical vinyl polymers suitable for use in this invention include polyvinyl chloride, polyvinyl acetate, polyvinylidene chloride, and copolymers of these compounds.

Plastisol: Liquid dispersion of a finely divided resin in a plasticizer which becomes thermoplastic when fused by heating.

Plasticizer: Materials added to a plastic to facilitate compounding and improve flexibility and other properties of the finished product. They may be nonvolatile organic liquids or low-melting solids, especially phthalate, adipate, and sebacate esters, or tricresyl phosphate. Polyhydroxy alcohols are also typical members of the class.

Typical plastisols useful for the impregnation of polyurethane foams normally contain about equal parts, by weight, of one or more vinyl polymers and plasticizers. Freshly prepared plastisols are preferred for impregnation. Best results with respect to heat-sealability of the final product are obtained by employing from about 100 to 500 parts, by weight, of plastisol to 100 parts, by weight, of polyurethane foams. Especially useful plastisols contain equal parts of dioctyl phthalate mixed with polyvinyl chloride, polyvinyl acetate or copolymers of these.

The special techniques required to produce polyurethane foams having a high proportion of open cells, coupled with the added manufacturing operation of impregnation have combined to make the resulting products very expensive. As a consequence considerable effort and expense has been expended in seeking ways to produce a polyurethane foam which is heat-sealable without impregnation. One approach which has attracted considerable interest is that of forming the polyurethane foam in the presence of a plastisol such as a plastisol of the type generally used for post impregnation. Attempts have been made to produce heat-sealable urethane foam by adding relatively large amounts of plastisol to the foaming mixture either during foaming or before. The plastisols selected have been of the same class as those successfully employed in the preparation of heat-sealable foams by post impregnation, and they have been employed in substantially the same quantities. The results have not been encouraging, and the art has long sought other means of solving the problems.

This invention provides a novel process for effecting this desired result, using novel plastisol compositions. Moreover, the new heat-sealable polyurethane foam products obtained in the practice of the invention manifest unexpected improvements compared with similar products prepared utilizing previously known techniques. In the process of this invention the novel foam products are produced by mixing together the foam-forming ingredients and the plastisol at room temperature and allowing the reaction to take place in the usual manner. It is an unexpected advantage of this invention that the processing techniques employed do not differ appreciably from standard procedures normally utilized in the production of ordinary polyurethane foam.

Polyurethane foams are typically prepared by the process which comprises reacting together an organic polyisocyanate and a compound containing active hydrogen atoms, e.g. a polyol resin, in the presence of a gas-producing agent and other additives which may include catalysts, stabilizers, dyes and similar materials. The reaction is normally effected by bringing the reactants together at room temperature in a mixing nozzle. The mixture is deposited from the nozzle into a mold, which may be a continuous mold, and the ingredients react together to form a polyurethane foam as they are carried away from the deposit station. Preheaters or cooling devices may be employed to vary the temperature of the reactants so as to control the viscosity of the components or to prevent unnecessary evaporation losses. Conveyor heating or cooling devices may also be employed to control the rate of reaction during the foaming process and to control the properties of the foam produced.

As is well known to those skilled in the art of polyurethane foam production, the manufacture of a useful foam requires a very delicate balance in quantity and quality of the foam forming ingredients. Even minute departures from this balance may lead to non-uniform cell structure, undesirable variations in density, cracks and fissures, blow-holes and occasionally even total collapse or breaking of the foam. Even small additions of extraneous materials such as oily plastisols and plasticizers are capable of destroying this delicate balance. As little as ten percent, by weight, based on the weight of resin, of dioctyl phthalate, tricresyl phosphate or other conventional plasticizer may be injurious.

Modified polyurethane foams to become heat-sealable under practical, commercial manufacturing conditions should contain for each 100 parts of polyol resin used to prepare the foam, from 50 to 250 parts of thermoplastic vinyl polymer dispersed in a plastisol. Plastisols containing these amounts of resin will usually contain equal quantities of plasticizer. In view of the deleterious consequences of even ten percent by weight of plasticizer in the foaming mixture it is not surprising that previous attempts to form heat-sealable polyurethane foams in the presence of vinyl plastisols have met with little success.

A principal feature of this invention is the discovery that it is possible to incorporate from 10 to 500 parts by weight of selected plastisols into a foaming mixture to produce useful heat-sealable products, the proportion being calculated on the basis of 100 parts of polyol resin utilized in the preparation of the foam.

This invention will be better understood if, at this point, a distinction is made between monomeric and polymeric plasticizers. As used in this disclosure, the term "monomeric plasticizer" refers to a plasticizer which does not have repetitive chemical units, a "polymeric plasticizer" is one having at least two repetitive chemical units. As will be explained more fully hereinafter, polymeric plasticizers useful in this invention have a molecular weight of from about 1000 to 10000. Dioctyl phthalate and tricresyl phosphate are included within the class of monomeric plasticizers, as are compounds formed by reaction between one mole of an alkylene or arylene dibasic acid and two moles of an alkylene diol. Alkylene or arylene groups may contain up to seven carbon atoms. Esters of dibasic acids and long chain alcohols such as isodecyl pelargonate, dodecyl adipate, dodecyl azelate and the like, are also included.

A typical monomeric plasticizer is the diacetylated product formed by diacetylation of diester produced from the reaction between one mole of adipic acid and two moles of ethylene glycol. It is represented by the formula:

$$CH_3COOC_2H_4OCO(CH_2)_4COOC_2H_4OCOCH_3$$

A typical polymeric plasticizer could be formed by reacting at least two moles of an alkylene or arylene dibasic acid with at least three moles of an alkylene diol. The compound formed by reaction between adipic acid and ethylene glycol, and later acetylated with one mole of acetic anhydride would be represented by the formula:

$$CH_3CO[OC_2H_4OCO(CH_2)_4COO]_xC_2H_4OCOCH_3$$

wherein $x$ is an integer. For use in this invention the polymeric plasticizer should be one in which $x$ is sufficiently large so that the molecular weight of the polymer is from about 1000 to 4000, preferably about 1500 to 3500 since best results consistent with economy and ready availability of plasticizer are thereby obtained.

It has now been discovered that a mixture of reaction inert, active hydrogen-free monomeric ester plasticizers, polymeric plasticizers and tackifiers (which do not have to be reaction inert), as hereinafter described, can be employed in the preparation of novel plastisols of vinyl polymers; and that heat-sealable polyurethane compositions can be formed by mixing such plastisols with the ingredients of a foam-forming mixture either before or during foaming. The most suitable polymeric plasticizers are those derived from diols and dibasic acids in which the free hydroxyl groups are blocked by acylation or alkoxylation with lower acyl or alkoxy groups containing only carbon, hydrogen and oxygen up to a total of five carbon atoms. Blocking groups containing one or two carbon atoms are preferred for simplicity. The plastisols can be mixed with the foaming ingredients before or during the actual foaming and the foam will not break or collapse, even when the amount of vinyl plastisol is such that the weight ratio of plastisol to polyol resin in the foam is from about 10 to 500 parts plastisol to 100 parts resin. The polymeric plasticizer appears to have a stabilizing influence on the system.

The tackifier perofrms the function of imparting tackiness and adhesiveness to the product at the elevated temperatures employed in heat lamination without at the same time imparting these same properties to the product at ordinary temperatures where they would be disadvantageous. Tackifiers are a well known class of compounds employed in formulating adhesives, rubber compounds and various thermoplastic compositions. Some of them also function as simple plasticizers in certain compositions. Suitable tackifiers for use in this invention are exemplified by wood resin (polyabietic acids), abietyl alcohol, piccoline and indene resins, chlorinated polyphenyls such as those commercially available under the name Arochlor and chlorendic acid esters such as dimethyl chlorendate or diallyl chlorendate. The preferred tackifiers from the point of cost and efficiency are chlorinated polyphenyls, abietyl alcohol and dimethyl chlorendate. It should be noted that abietyl alcohol contains an isocyanate reactive hydroxyl group. It is apparent therefore, that the tackifier does not have to be reaction inert. Apparently the limited amount of tackifier employed does not result in a harmful degree of reaction.

The novel plastisols of this invention can be incorporated in the foam forming ingredients in amounts up to 500 parts plastisol per 100 parts polyol, to produce heat-sealable foams which do not break. The plastisols comprise from about 40 to 60 parts vinyl polymer, from about 15 to 30 parts monomeric plasticizer, from about 10 to 20 parts polymeric plasticizer, and from about 5 to 10 parts tackifier. Other ingredients such as are often employed with plastisols may also be present. These may include from 1 to 2 parts of liquid vinyl stabilizers such as fatty acid salts of barium, cadmium or zinc, or any of the known organo tin stabilizers such as dibutyl tin dilaurate and dimaleate. From 5 to 15 parts of a flame retardant such as antimony oxide, calcium phosphate, and the like, may also be employed. In defining the novel plastisols of this invention the amounts of all ingredients are given in parts by weight, based on the total weight of plastisol.

A typical plastisol within the scope of this invention contains 50 parts of Geon 135 which is a copolymer of polyvinyl chloride and polyvinyl acetate, 20 parts of dioctyl phthalate, 15 parts of an acetylated poly 1,3-butaylene adipate with a molecular weight of about 2000, and 10 parts of Arochlor 1254, a chlorinated polyphenyl.

As aforesaid, the amount of plastisol employed in the preparation of the foams of this invention may vary from 10 to 500 parts plastisol per 100 parts polyol resin. Generally speaking, the amount of plastisol employed will vary with the desired properties and end use of the foam. For dielectric heat-sealing, from about 50 to 200 parts plastisol may be utilized, with 100 to 150 parts being preferred for best economy and efficiency. If the foam is to be used for flame lamination considerably lesser quantities of plastisol will be used. The amount may vary from 10 to 200 parts by weight, with 20 to 40 parts being preferred. Surprisingly, even the use of large amounts of the novel plastisols does not result in a foam product which is soggy or tacky to the touch.

The reaction mixtures employed to form the novel foams of this invention will include at least one organic polyisocyanate. Useful oragnic polyisocyanates include arylene diisocyanates, or triisocyanates, typically toluene diisocyanate, phenylene diisocyanate, toluene triisocyanate, benzidine diisocyanate, mesitylene diisocyanate, durene diisocyanate, naphthalene diisocyanate, etc.; and aliphatic polyisocyanates typically hexamethylene diisocyanate, 4,4'-methylene bis(cyclohexyl isocyanate), decamethylene diisocyanate, etc. The preferred polyisocyanates are the arylene diisocyanates and particularly the commercially available 80/20 mixture of 2,4- and 2,6-toluene diisocyanate.

The reaction mixture will also contain at least one organic compound having at least two isocyanate-reactive hydrogen atoms. The presence of such isocyanate-reactive or "active" hydrogen atoms is readily determined by analytical methods such as the Zerewitinoff determination.

In order to produce the desired polymeric structure, the compound employed will have at least two active hydrogen atoms. For convenience these compounds are referred to herein as polyol resins since they are normally hydroxyl terminated compounds of elevated molecular weight.

The organic compound having at least two isocyanate-reactive hydrogen atoms can be a polyether, a polyester, a polyamine, a polythioether, etc. or mixtures thereof. Suitably it will be a compound of relatively high molecular weight, such as about 200 or greater. In preferred embodiments of the invention, the compound will be a polyester prepared by reacting at least three moles of at least one alkylene glycol with at least two moles of at least one alkylene or arylene dicarboxylic acid. The useful alkylene glycols include ethylene glycol, diethylene glycol, propylene glycol, tetramethylene glycol, 1,6 hexamethylene glycol, 1,10-decalene glycol, neopentyl glycol. The preferred dicarboxylic acids include adipic acid, sebacic acid, azelaic acid, phthalic acid, hydrogenated phthalic acid, chlorinated phthalic acid, etc. It can also be a polyalkylene polyester such as those prepared by reacting ethylene glycol, propylene glycol, tetramethylene glycol, hexametriol, trimethylol propane and polymers thereof with other dicarboxylic acids such as those derived from castor oil, tall oil fatty acids, and other fatty acids; or dicarboxylic acids such as succinic acid, maleic acid, isophthalic acid, chlorendic acid, etc. Mixtures of polyesters and polyethers may be employed. It is preferred that the polyalkylene polyether and polyalkylene polyester have a molecular weight between about 1000 and about 10,000.

A specifically preferred compound is a polyester having a molecular weight of about 2000 made from 7 moles of adipic acid, 8 moles of diethylene glycol, and ⅓ mole of trimethylol propane.

The reaction mixture will also contain a gas-producing agent in order to achieve the desired cellular structure. The gas-producing agent can be water which reacts with the isocyanate to form carbon dioxide, or it can be an inert, volatile liquid or gas, such as methylene chloride, low-boiling hydrocarbons, e.g. propane, propylene, butane, etc., or the fluorinated aliphatic compounds sold under the trademark Freon. Mixtures of two or more gas producing agents may be employed. By varying the water content or the amount of any other gas-forming chemical employed novel foam products with a wide density range may be obtained.

The reaction mixture will generally contain one or more catalysts for the foaming reaction. Useful catalysts include amines such as triethylene diamine and N-ethyl morpholine, organometallic compounds such as dibutyl tin dilaurate and metallic compounds such as stannous octoate. Additional components such as cell modifiers, emulsifiers, dyes, pigments, etc., may also be present.

The amounts of each ingredient employed in the preparation of the final, heat-sealable foam products of this invention may vary within wide limits. Typical formulations will contain for each 100 parts of the polyol or active hydrogen-containing compound, 5 to 80 parts organic polyisocyanate, 1 to 35 parts gas-producing agent, of which about 1 to 6 parts are water, and 10 to 500 parts of the novel plastisol.

With the exception of certain tackifiers, the components of the novel plastisols described herein are inert with respect to the foam-forming ingredients, i.e. the organic polyisocyanate the polyol ir compound having the active hydrogen atoms, the gas-producing agent and the other constituents of the mixture. By this it is meant that the components exhibit no substantial chemical or physical affinity for the foam-forming constituents, i.e. they are not dissolved by or reacted with them under the conditions of the reaction which forms the final products. The property is readily determined by conventional testing procedures.

The novel foam products of the invention are prepared by mixing together all of the components in the usual manner employed for preparing ordinary foams. In fact, it is a special and most unexpected advantage of this invention that it is not necessary to depart from the usual techniques generally employed in standard commercial operations. Any of the usual foam formulations utilized to prepare foams with different physical characteristics may be employed. It is, however, generally desirable to increase the amount of catalyst utilized so that its concentration in the final mixture including the plastisol is the same as it would have been if the foam were to have been prepared without the plastisol. The product may be prepared with or without a prepolymerization step. When such a step is used, the polyol is premixed with an excess of polyisocyanate to produce an isocyanate terminated prepolymer which is then mixed with the previously mentioned components, and foamed in the usual manner.

Preheating or cooling devices can be used as described above, and for the same purposes.

After the reaction mixture is poured into a continuous or discontinuous mold the spontaneous reaction rapidly becomes vigorous. The creaming time which is the time from the beginning of mixing until the volume of the mixture increases is usually between 5 and 10 seconds. The foam rises rapidly, developing an exotherm which may attain a temperature as high as 250° F. in the interior of the foam body. The maximum expansion of the foam occurs in about one to three minutes. The foam sets during this period.

The foam may be produced in the form of buns which may be either continuous or discontinuous, or in any of the other shapes in which polyurethane foams are normally produced. The porduct is cured and ready to be cut into any desired shape or peeled to form a continuous ribbon using the usual techniques about 5 to 10 minutes after it has set.

With ordinary foams, especially polyether foams, it is often necessary to cure the foam by heating to develop physical properties such as tensile strength and elongation, and tear strength, to a useful degree. Even without curing, the foams of this invention, as formed, have these properties to substantially the same degree as cured prior art foams. Curing of the heat sealable foams of the invention does, however, markedly improve the physical properties. It is effected by heating the foam at about 250° F. to 350° F. for from about 1 to 15 minutes. The preferred temperatures range from the standpoint of achieving desirable improvements in physical properties at a reasonable cost is 280° F. to 350° F. A particular advantage of these foams is that the curing treatment can be applied at any time after the foam has set. Thus the curing oven may be made part of the production line, and all of the foam can be cured in the course of its manufacture. Alternately, the foam can be cured after it has been cut or peeled into slabs, sheets, or other forms, which may be even several days after the original production. By this post-treatment it is often possible to more than double tear strength and elongation and to triple the tear strength.

The foams of the invention, as prepared, have an exceptionally low compression set when compared with ordinary vinyl impregnated foam, despite the large amounts of vinyl polymer which may be present. In many samples, the compression set at 90% compression after six hours is only about 2.5 to 8%, and even after 22 hours it is only about 12%.

The novel foams are useful for many purposes but are especially useful in the formation of laminates by heat-sealing to themselves, other cellular products, synthetic and natural fabrics, plastic films, pressed board, wood, or other laminar substrates. For this purpose they have a number of advantages compared with analogous products formed by post-impregnation of already formed foams. The tear seals which can be effected with these foams are generally better than with post-impregnated foams. This means that it is possible to prepare products by dielectrically heat-sealing and die-cutting in one operation with a minimum of rejects arising from deficiencies of the seal at the edge of the piece. It is extremely difficult to post-impregnate relatively thick sheets of foam and to obtain a uniform product. Because of the process by which the products of this invention are prepared, the vinyl plastisol is uniformly distributed throughout the foam body as it forms. Therefore, heat-sealable slabs and sheets of substantially any desired thickness are possible.

The foams of this invention may be heat-sealed by any of the usual techniques, including the use of dielectric presses and dies, heated blades or rollers, heated dies, heated embossing rolls and presses, or the like. The foams flame-laminate more rapidly and at much lower temperatures than ordinary flame-sealable foams. This valuable property makes increased production of bonded fabrics possible, and also avoids scorching or discoloring of the material with which the foam is flame-laminated. Therefore, these new foams can be flame-laminated to such easily inflammable materials as paper, cheese cloth, thin voile, and the like, without difficulty. Bonding temperatures can be as low as 250° F. Moreover, the seal between the foam and the other laminar layer is stable at temperatures as high as 200° F. to 225° F. or even higher so that there is little or no tendency towards delamination even at these high temperatures.

Other bonding methods such as plasma jet, corona discharge, electron beam, hot gas and high voltage techniques are also useful. The most preferred technique is, however, dielectric heat-sealing wherein the composition is heated by setting up an electric field. The bond is formed by applying the desired degree of pressure after the composition has been softened by the generated heat.

While this invention has been principally described as applied to cellular polyurethanes, it is not so limited. The advantages in respect of cellular polyurethanes are also applicable to non-cellular polyurethanes, such as polyurethane films, solid polyurethane elastomers, etc. Such non-cellular polyurethanes can readily be rendered heat-sealable by the incorporation therein of the novel vinyl plastisol composition, herein described.

Formulations employed for the production of such non-cellular polyurethanes will vary depending upon the precise nature of the desired product. In general, however, the formulations will contain at least one compound having at least two isocyanate reactive hydrogen atoms, at least one organic polyisocyanate, as well as the novel vinyl plastisol composition above described. The polyurethane composition produced will have the valuable properties of easy heat bonding by dielectric-, flame-, corona discharge, hot sampling, hot embossing, and hot air blasting and other analogous procedures.

A typical polyurethane elastomer formulation will contain 100 weight parts of the isocyanate-terminated poly (tetramethylene ether) glycol, available under the trade name of Adiprene L; 11 parts by weight of 4,4'-methylene bis (2-chloroaniline); and 200 parts by weight of the herein described novel vinyl plastisol. A suitable plastisol of the invention for use in such an elastomer would contain 100 parts by weight of Geon 135; 50 parts by weight of dioctyl phthalates; 30 parts by weight of diacetylated poly-1,3-butylene adipate with a molecular weight of about 2000; 18 parts by weight of Arochlor 1254; and 2 parts by weight of any of the fatty acid salts of barium, cadmium, and zinc, normally employed as vinyl stabilizers.

The following non-limiting examples are given by way of illustration only.

EXAMPLE 1

The following ingredients are mixed and foamed continuously in a standard commercial foaming machine:

| | Parts by wt. |
|---|---|
| (1) A polyester which is a poly-diethylene-glycol-adipate of molecular weight of 2000 and hydroxyl number of 52, sold as Fomrez-50 | 100 |
| (2) An ethoxylated poly-dimethyl siloxane emulsifier, sold as L–532 | 1 |
| (3) N-ethyl morpholine (as a catalyst) | 3 |
| (4) A hexadecyl - N - dimethyl amide (as a catalyst) | 0.6 |
| (5) Water | 3.0 |
| (6) Toluene diisocyanate | 46.0 |
| (7) Special vinyl plastisol composition | 130.0 |

The vinyl plastisol composition contained:

| | Percent by wt. |
|---|---|
| (A) Plastisol-grade copolymer of vinyl chloride and vinyl acetate, sold as Geon 135 | 49.0 |
| (B) Diisooctyl phthalate (plasticizer) | 25.0 |
| (C) Diacetylated poly-1,3-butylene glycol adipate of molecular weight of 2,000, sold as P–51A | 18.0 |
| (D) Chlorinated polyphenyl, sold as Arochlor 1254 | 7.0 |
| (E) Vinyl stabilizer, which is a triple mixture of barium, cadmium, and zinc octoate, sold as 6V6A | 1.0 |
| | 100.0 |

This plastisol composition had a viscosity at 25° C. of 15,000 cps. and $D_4^{25}=1.2$. All components from 1 to 7 were simultaneously introduced into the mixing head of the machine. The cream time was about 6 seconds and the rise-curing time 125 seconds. The resulting foam had a uniform cell structure of about 30 cells per linear inch.

The physical properties of this foam were:

| | |
|---|---|
| Density, lbs./cu. ft. | 3.90 |
| Tensile strength, lbs./sq. in. | 10.0 |
| Elongation, percent | 65 |
| Tear strength, lbs./in. | 1.3 |
| Compression set: | |
| 90% 6 hrs. | 5.0 |
| 90% 22 hrs. | 9.6 |
| Burning rate, in./min. | 1.9 |
| Percent extractables with methyl isobutyl ketone (MIBK) | 42 |

The same foam after heating for 5 minutes at 300° F. showed the following physical properties:

| | |
|---|---|
| Density, lbs./cu. ft. | 3.90 |
| Tensile strength, lbs./sq. in. | 22.30 |
| Elongation, percent | 123 |
| Tear strength, lbs./in. | 3.4 |
| Compression set: | |
| 90% 6 hrs. | 7.2 |
| 90% 22 hrs. | 10.0 |
| Percent extractables with MIBK | 39 |

Above foam before and after heat treatment manifested excellent and permanent dielectric sealability at 5 seconds heating time and 100 p.s.i. pressure starting at as low a temperature as 250° F. while for maximum bond the preferred temperature for dielectric sealability was from 288° F. to 325° F.

Specimens of this foam were flame laminated to each other and to a number of woven and non-woven fabrics, paper and plastic foil. They were also sealed dielectrically to each other, to vinyl coated cloth, and to various fabrics, on one side and on both sides. They were sealed dielectrically to soft and hard board (Masonite) on one side of the foam, and various knit fabrics (both top coated and impregnated with vinyl) on the other side of the foam at temperatures as low as 288° F. Separate specimens of the foam, 1/8 inch and 3/32 inch thick were sealed dielectrically at 100 p.s.i. die pressure and 313° F., between a 0.8 mil coated board and a knit fabric which was top coated with a vinyl resin. The resulting product, after aging at 200° F. for 7 days, had a peel strength of 20 oz. when tested by standard method.

EXAMPLE 2

The following ingredients were mixed and foamed continuously in a standard commercial foaming machine:

| | Parts by wt. |
|---|---|
| (1) Fomrez 50 | 100.0 |
| (2) L–532 | 1.5 |
| (3) Diethylene diamine (catalyst sold as Dabco) | 0.5 |
| (4) Octadecyl-N-dimethyl amide (catalyst) | 0.6 |
| (5) A green oil soluble dye | 1.0 |
| (6) Water | 3.8 |
| (7) Toluene diisocyanate | 46.0 |
| (8) Hexamethylene diisocyanate | 10.0 |
| (9) Antimony oxide | 10.0 |
| (10) Methylene chloride | 5.0 |
| (11) Special vinyl plastisol composition | 70.0 |

The vinyl plastisol composition was previously prepared and contained:

| | Percent by wt. |
|---|---|
| (A) Plastisol-grade vinyl chloride acetate copolymer sold under the name of Pliovac AO | 50.0 |
| (B) Tricresyl phosphate | 30.0 |
| (C) Diacetylated poly-neopentyl glycol azelate of molecular weight 2000 | 13.0 |
| (D) Hydrobietyl alcohol, a hydrogenated rosin sold under the name of Abitol | 5.0 |
| (E) Cadmium oleate (stabilizer) | 2.0 |
| | 100.0 |

The vinyl plastisol composition was prepared by sequentially compounding first B, C, D, and E, and A was added to this fluid in small portions while mixing with a Cowles Dissolver type agitator. As soon as all of the polyvinyl resin was dissolved and the resulting viscous liquid became a uniform liquid free of suspended specks of the vinyl resin, the plastisol was strained from possible impurities and introduced directly into the mixing head of the foaming machine, simultaneously with the other ingredients and foamed upon a continuously moving mold-conveyor.

The cream time was 10 seconds and the full rise and gelling time was 110 seconds. The resulting foam had a uniform cell structure of about 40 cells per linear inch.

The physical properties of this foam were:

| | |
|---|---|
| Density, lbs./cu. ft. | 2.5 |
| Tensile strength, lbs./sq. in. | 12.0 |
| Elongation, percent | 76 |
| Tear strength, lbs./in. | 1.7 |
| Compression set: | |
| 90% 6 hrs. | 7.0 |
| 90% 22 hrs. | 11.0 |
| Percent extractables with MIBK | 25 |

The foam was self-extinguishing after burning for 44 seconds.

The foam after being kept for 3 minutes at 280° F. had the following physical properties:

| | |
|---|---|
| Density, lbs./cu. ft. | 2.45 |
| Tensile strength, lbs./sq. in. | 18 |
| Elongation, percent | 110 |
| Tear strength, lbs./in. | 2.8 |
| Composition set: | |
| 90% 6 hrs. | 5.0 |
| 90% 22 hrs. | 7.0 |
| Percent extractables with MIBK | 23 |

Above foam without curing showed excellent overall heat bonding properties when flame or dielectrically sealed to the same laminar layers described in Example 1.

EXAMPLE 3

The following composition was mixed (in a commercial foaming machine) and foamed upon a continuously moving conveyor lined with a silicone coated Kraft paper. The conveyor is described in U.S. Pat. No. 3,296,658.

|  | Parts by wt. |
| --- | --- |
| (1) Fomrez 50 | 100.0 |
| (2) L–532 | 1.5 |
| (3) Dabco | 1.0 |
| (4) Tin octoate | 0.25 |
| (5) A yellow oil soluble dye | 2.0 |
| (6) Water | 5.0 |
| (7) Toluene diisocyanate | 64.0 |
| (8) Antimony oxide | 15.0 |
| (9) Special vinyl plastisol composition | 150.0 |

The vinyl plastisol composition was previously prepared from the following ingredients:

|  | Percent by Wt. |
| --- | --- |
| (A) Pliovac AO | 19.0 |
| (B) Geon 135 | 30.0 |
| (C) Diisooctyl phthalate | 17.0 |
| (D) P 51A | 18.0 |
| (E) Dimethyl chlorendate | 8.0 |
| (F) Arochlor 1260 | 7.0 |
| (G) 6V6A | 1.0 |
|  | 100.0 |

This special vinyl plastisol composition was made as follows:

As dimethyl chlorendate (E) is a crystalline solid, the mixture of E and F was heated to 210° F. until a clear solution resulted. C and then D were introduced into this mixture; G was added and all were mixed well until a clear solution resulted. The mixing temperature was kept at 90° F. Finally, B followed by A was added while mixing well with a Cowles Dissolver. Mixing was continued to form a uniform viscous, milky fluid having a viscosity of about 20,000 cps. at 80° F. Care was taken not to heat over 100° F. For convenience the antimony oxide (8) was added to the plastisol composition in sufficient quantity so as to provide 15 parts by weight for each 100 parts by weight of Fomrez 50 as indicated above.

The resulting vinyl plastisol containing antimony oxide was metered from a separate tank at a rate of 150 parts by weight per 100 parts by weight of Fomrez 50 (1) along with the other ingredients indicated above, through the mixing head of a foaming machine onto a continuous open mold.

The cream time of the resulting foam was about 5 seconds and the rise-gelling time was 100 seconds. The foam which was cured in 5 minutes had a uniform cell structure of about 30 cells per linear inch.

The physical properties of this foam tested after 8 hours are as follows:

| | |
| --- | --- |
| Density, lbs./cu. ft. | 2.0 |
| Tensile strength, lbs./sq. in. | 9.5 |
| Elongation, percent | 75 |
| Tear strength, lbs./in. | 1.5 |
| Compression set: | |
| 90% 6 hrs. | 3.0 |
| 90% 22 hrs. | 11.0 |
| Burning rate, inc./min. | (1) |
| Percent extractables with MIBK | 45 |

[1] Self-extinguishing, 10 sec.

The same foam being post cured at 300° F. for three minutes showed the following improved physical properties:

| | |
| --- | --- |
| Density, lbs./cu. ft. | 8.0 |
| Tensile strength, lbs./sq. in. | 19 |
| Elongation, percent | 145 |
| Tear strength, lbs./in. | 3.0 |
| Compression set: | |
| 90% 6 hrs. | 4.0 |
| 90% 22 hrs. | 9.0 |
| Percent extractables with MIBK | 47 |
| Burning rate, in./min. | (1) |

[1] Self-extinguishing, 8 sec.

The foam was dielectrically and flame sealed to the same laminar layers as described in Example 1.

The heat sealable foams of this invention should be carefully distinguished from the foams produced by direct impregnation. A most important distinction from the point of view of preparing laminated products is that the strength of the seal produced with the foams of this invention at a density of only four pounds per cubic foot is substantially equivalent to that of the seal which can be produced with impregnated foam having a density of about eleven pounds per cubic foot. This means that less costly laminar products having the properties of more expensive laminates can be prepared utilizing the products of this invention.

The results reported in the table further illustrate the distinctions between post-impregnated foam and products prepared by the procedures set forth herein. The table lists various physical properties of two foams, both of which are suitable for dielectric sealing to vinyl films or textiles for the preparation of automotive seats and other comparable products. Although the densities of the two foams are considerably different, the products are comparable because the strength of the bonds obtainable by dielectric sealing to a fabric or a plastic film is substantially the same with each product. The product whose physical properties are reported in column 1 is a polyurethane foam impregnated with about 500 parts by weight of a vinyl plastisol containing approximately 50% by weight of plastisol grade polyvinyl chloride and 50% by weight dioctyl phthalate. The product whose physical properties are reported in column 2 is the cured product obtained by the procedure of Example 1.

TABLE

|  | 1 | 2 |
| --- | --- | --- |
| (1) Density, lbs./cu. ft. | 11.0 | 3.90 |
| (2) Tensile strength, lbs./sq. in. | 9.6 | 22.30 |
| (3) Elongation, percent | 91 | 123 |
| (4) Tear strength, lbs./in. | 1.2 | 3.4 |
| (5) Compression set: 90% for 11 hrs. | 48.2 | 10.0 |
| (6) Extractables with MIBK, percent | 82 | 39 |

It can be seen from the table that the compression set of the product of Example 1 is approximately five times lower than that of the comparable post-impregnated product. The tear strength is approximately three times higher, the tensile strength is aproximately twice as great and the elongation is substantially improved. The amount of extractables in the post-impregnated foam is more than twice the amount of extractables in the product of Example 1.

What is claimed is:

1. A plastisol composition useful for the preparation of heat sealable polyurethane foams by mixing together with the foam forming ingredients comprising from about 40 to 60 parts by weight of a vinyl polymer selected from the group consisting of polyvinyl chloride, polyvinyl acetate, polyvinylidene chloride and copolymers thereof, from about 15 to 30 parts by weight of a monomeric plasticizer selected from the group consisting of dioctyl phthalate, diisooctyl phthalate and tricresyl phosphate, from about 10 to 20 parts by weight of a polymeric plasticizer selected from the group consisting of diacetylated poly-1,3-butylene glycol adipate and diacetylated poly-neopentol glycol azelate, and from about 5 to 10 parts by weight of a tackifier selected from the group consisting of chlorinated polyphenyls, hydrobietyl alcohols and dimethyl chlorendate, all based on the total weight of the plastisol.

2. A composition as in claim 1 additionally containing from 1 to 2 parts by weight of vinyl stabilizers selected from the group consisting of barium, cadmium and zinc salts of fatty acids, dibutyl tin dilaurate and dibutyl tin dimaleate.

3. A composition as in claim 1 wherein the vinyl polymer is a copolymer of a vinyl chloride and vinyl acetate.

4. A composition as in claim 2 additionally containing from 5 to 15 parts by weight of a flame retardant selected from the group consisting of antimony oxide and calcium phosphate.

References Cited

UNITED STATES PATENTS

| | | | |
|---|---|---|---|
| 3,382,198 | 5/1968 | Elslager | 260—31.6 |
| 2,815,354 | 12/1957 | Wilkinson et al. | 260—485 G |
| 3,615,106 | 10/1971 | Flagagan | 260—27 EV |

FOREIGN PATENTS

| | | | |
|---|---|---|---|
| 595,005 | 11/1947 | Great Britain | 260—27 EV |
| 708,663 | 5/1965 | Canada | 260—27 EV |

OTHER REFERENCES

"Encyclopedia of Chemical Technology," December 1953, pp. 806–807.

"B. F. Goodrich Co.," May 1952, pp. 4–7.

"Carpenter," Flame retardance in plastics (1951), pp. 541–542.

DONALD E. CZAJA, Primary Examiner

W. E. PARKER, Assistant Examiner

U.S. Cl. X.R.

260—23 A X, 31.6, 32.2